Sept. 29, 1925.  
G. B. STARIE  
1,555,768  
SYSTEM OF CONTROL FOR DYNAMO ELECTRIC MACHINES  
Filed Sept. 9, 1924  5 Sheets-Sheet 3

Inventor:  
George B. Starie,  
by  
His Attorney.

Patented Sept. 29, 1925.

1,555,768

UNITED STATES PATENT OFFICE.

GEORGE B. STARIE, OF SCHENECTADY, NEW YORK, ASSIGNOR TO GENERAL ELECTRIC COMPANY, A CORPORATION OF NEW YORK.

SYSTEM OF CONTROL FOR DYNAMO-ELECTRIC MACHINES.

Application filed September 9, 1924. Serial No. 736,776.

*To all whom it may concern:*

Be it known that I, GEORGE B. STARIE, a citizen of the United States, residing at Schenectady, in the county of Schenectady, State of New York, have invented certain new and useful Improvements in Systems of Control for Dynamo-Electric Machines, of which the following is a specification.

My invention relates generally to improvements in the control of dynamo-electric machines, and in particular to the control of separately excited dynamo-electric machines inter-connected in what is known in the art as a Ward-Leonard type of drive wherein a portion of the machines operates as a motor driven from another portion of the machines operating as a generator, the direction of operation of the motor portion, the speed thereof, the acceleration and retardation thereof being under the control of a controller which controls the separately excited field of the generator portion of the machines or controls the separately excited fields of both the generator and motor portions of the machines.

Although not necessarily limited thereto, the system of the invention is particularly applicable to the operation of reversing rolling mills and the like, where normal operation demands rapid acceleration, retardation and reversal of the mill in quick succession.

A control system to properly regulate such a drive in the satisfactory performance of its various functions is necessarily complicated since it should make provision for the following:

1. Sufficient steps or control points to give the required nicety of control of the speed of the driving motor or motors.

2. Rapid acceleration of the motor or motors by control of the energization of the field windings of the generator or generators in such a manner that normal or excess excitation voltage is applied to the generator field windings until or substantially until the generator voltage has increased to a predetermined value and the motor speed has correspondingly increased to a predetermined value. This is called generator field "forcing" by those skilled in the art.

3. Rapid retardation of the motor speed by control of the energization of the field windings of the motor or motors in such a manner that normal or excess excitation voltage is applied to the motor field windings until or substantially until the motor speed has decreased to the predetermined value. This is called motor field "forcing" by those skilled in the art.

4. Prevention of premature weakening of the motor field on acceleration of the motor and prevention of premature weakening of the generator field on retardation of the motor, in other words, control the degree of overlapping of the motor and generator field regulation.

5. Limitation of the rate of acceleration and retardation of the motor or motors.

6. Insure that a uniform decrease in generator field strength will be had when the generator field excitation is decreased.

7. Continuation of generator field "forcing" until the motor has reached the predetermined speed.

8. Continuation of motor field "forcing" until the motor speed has decreased to the predetermined value.

One of the objects of the invention is to provide means whereby the above conditions are taken care of in a simple and effective manner.

A further object of the invention is the provision of an improved system of the character indicated, wherein a comparatively simple manually operated or controlled master switch may be employed and the operation of the various parts of the system so coordinated with respect to the speed of the mill motor or motors that the motor or motors and the generator or generators are protected satisfactorily regardless of the rate of manipulation of the controller.

These and other objects of the invention, as will be either pointed out specifically hereinafter or as will be apparent to those skilled in the art, are attained in the system illustrated in the accompanying drawings, in which.

Referring to the drawings, the dynamo-electric machines to be controlled are indicated as two generators having armatures Ga1 and Ga2 and their respective fields Gf1 and Gf2, and motors having armatures Ma1 and Ma2 and field windings Mf1 and Mf2, respectively. The generators may be driven in any suitable manner, as by means of an alternating current motor (not shown) and when the equipment is used in a rolling mill drive, a fly wheel (not shown) is preferably mounted on the shaft of the generators. By reference to Figure 1, it will be seen that the armatures of these machines are alternately connected in a local circuit, and a circuit breaker CB is included in this local circuit. The generator fields and the motor fields are arranged to be separately excited and the field windings of the machines are arranged to be controlled by electro-magnetic switches or contactors which in turn are under the control of electro-magnetic relays, the whole being under the control of a master controller MC. This master controller has a neutral position, that in which the controller is indicated in the drawing, a position for forward motor operation and for reverse motor operation, as indicated. A plurality of separate control points or steps are provided for each of the forward and the reverse positions of the master controller, and in the present embodiment of the invention ten control points are provided for each direction of motor operation.

Figure 1:
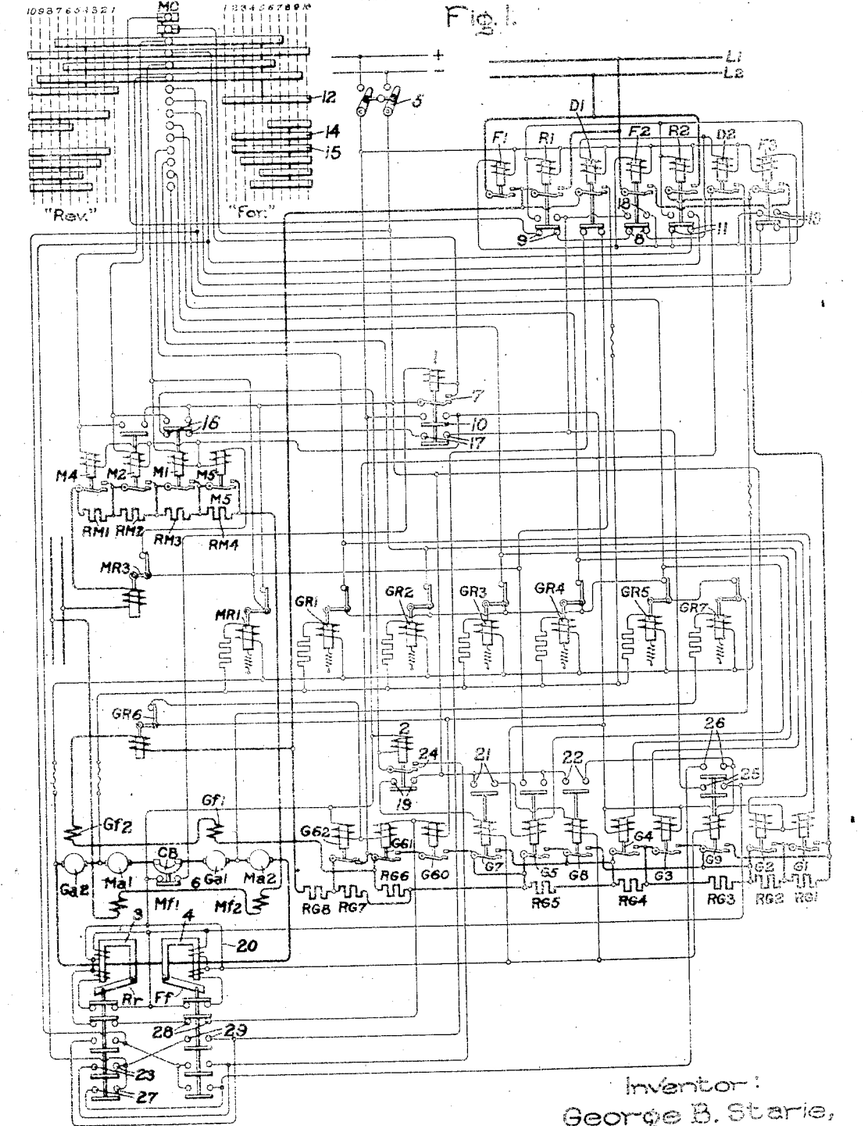
Figure 1 shows a system of control in accordance with the invention.

The value of the current in the generator field windings is regulated by means of the resistors RG1 to RG8, inclusive, and these resistors or sections of a resistance are arranged to be respectively short-circuited by means of the contactor G1 for the section RG1; G2 to the section RG2; G3 for the section RG3; G4 for the section RG4; G5 for the section RG5; G60 and 61 for the sections RG6. The contactor G62 controls the section RG7 during the field forcing interval. The sections RG1 to RG5 inclusive form a variable resistance which is cut out of circuit or into circuit, depending on whether the motor is being accelerated or retarded. The section RG6 is what may be termed a "permanent" resistance which is arranged to be in circuit at all times to prevent the excitation current exceeding a definite value, although this section may be momentarily shunted as during the field "forcing" interval. The resistor RG8 is arranged in multiple with the generator field windings to prevent an excessive "pump back" current from the motors in event of a sudden decrease of the applied generator field voltage due to quick manipulation of the controller or from other causes. This resistor also protects against excessive induced potential in the generator field circuit. The resistor RG7 limits the value of current taken from the excitation circuit during field forcing. The contactor G9 is arranged to short-circuit the sections RG1 and RG2, the contactor G8 is arranged to short-circuit the sections RG3 and RG4, and the contactor G7 is arranged to short-circuit section RG5 for the purpose of automatically controlling the generator field excitation to prevent undue weakening of the generator field when the master controller is manipulated rapidly.

Certain of the generator field resistance contactors are under the control of relays which are energized and actuated responsively to the voltage generated by one of the generator armatures. In the present embodiment of the invention, the relays GR1 to GR5 are energized responsively to the voltage of the armature of Ga2. The relay GR6 is energized responsively to the current in the generator field winding and is arranged to control the resistor contactor G62 to protect against excess generator voltage. The relay GR7 is energized responsively to the voltage of the motor armature Ma2 in order to protect against excess generator voltage.

The energization of the field windings of the motors is regulated by means of the resistors or sections of resistances RM1 to RM4, inclusive. The sections RM1 to RM3, inclusive, form a variable resistance which is cut into or out of circuit depending on whether the motors are being accelerated or retarded. The section RM4 is what may be termed a "permanent" resistance which is to be in circuit at all times to prevent the excitation current exceeding a definite value, although this section may be momentarily shunted as during the "forcing" interval. The contactor M4 is provided for short circuiting the resistance section RM1, the contactor M2 is provided for short circuiting the resistance section RM2, the contactor M1 is provided for short circuiting the section RM3, and the contactor M5 is provided for short circuiting the section RM4. The relay MR3 is provided for controlling the resistor contactor M5, responsively to the current taken by the motor field windings for the purpose of automatically controlling the motor field "forcing." The relay MR1 is energized responsively to the voltage generated by the armature of the generator Ga2 for the purpose of regulating the energization of the motor field windings in accordance with the generator voltage.

The generator field windings are arranged to be connected to the source of supply designated L1, L2, by means of the contactors F1, F2 and F3 for the forward direction of motor operation and by means of the contactors R1—R2 for the reverse direction of motor operation. The contactors D1 and D2 are provided for connecting the generator field windings in circuit with the armature Ga2 in such a way that the generated voltages of the generators will oppose the residual magnetism of the fields of the generators so as to reduce the generator voltage to zero in an extremely short time when the master controller is returned to the off or neutral position after being in a running position, either forward or reverse.

The relays Rr and Ff are provided for controlling the generator and motor field excitation to limit the rate of increase or decrease of the excitation of these machines in a manner to be hereinafter fully explained. The relay 1 is a low voltage protective device and is connected in the system in such a manner that in case the voltage of the source of supply fails the master controller must be returned to the off or neutral position before the equipment can be again started for either forward or reverse operation. The contactor 2 is provided for cooperation with the relays Rr and Ff for the purpose of retaining contactors, G7, G8 and G9 closed in response to a predetermined value of "pump back" current caused by a rapid manipulation of the master controller MC from a running position to the neutral position, thereby protecting the generator and motor armatures from an excessive current which would otherwise be caused by this rapid manipulation of the controller.

The relays Rr and Ff are polarized current limit relays which are provided for, among other uses, to reduce the rate of acceleration or retardation in event that an excessive load is imposed on the machines, and for automatically strengthening the motor fields in event that the load becomes excessive when operating under a weakened field condition. These relays are shown very diagrammatically and it is believed that with a brief description the construction and operation of the relays will be readily understood. As indicated these relays are adapted for mounting on a bus bar or conductor in the armature circuit of the machines. Each of the U-shaped magnet structures 3 and 4 is arranged so as to embrace the bus bar or conductor and the polarity of the relays is determined by means of the shunt coils with which the relays are provided. The flux due to the current in the bus bar may either boost or buck the influence of the shunt coil. In case of forward acceleration and excessive armature current the relay Ff will function; on retardation the armature current will reverse and if the reverse current is excessive, the relay Rr will function since the shunt coil of this relay is of opposite polarity as compared to the shunt coil of relay Ff. The action of the relays will reverse for reverse motor operation, namely relay Rr will function on acceleration and relay Ff on retardation. The pick-up of each of these relays is adjusted by means of varying the biasing effect of the armature toward the unattracted position so as to vary the magnetic pull necessary to move the armature to the attracted position. When this adjustment is made to increase the magnetic pull necessary to move the armature to the attracted position, the maximum permissible load on the machines will be increased and when the adjustment is such that the necessary magnetic pull is decreased, the maximum permissible load will be decreased.

The drop out setting of each of the relays Ff and Rr should ordinarily be from 80% to 90% of the pick-up setting, namely, if the relay picks up at 4,000 amperes it should release when the current drops to approximately 3,500 amperes. Adjustment of the drop out setting is made by adjusting the air gap between the free end of the relay armature and the end of the adjacent leg of the U-shaped magnet structure when the armature is in the attracted position. When the air gap is increased, the drop out value of the relay is raised, and decreasing this air gap will lower the drop out value.

Figure 2:
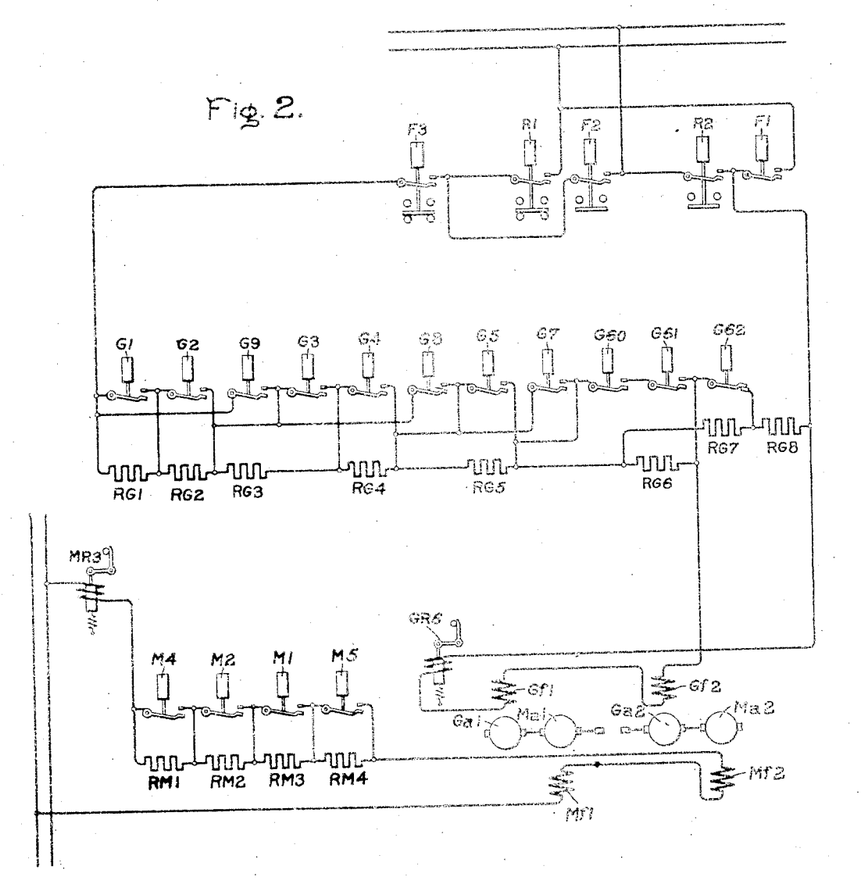
Figure 2 is a detail of Figure 1 showing a portion of the control for the generator and motor fields.
Figure 3:
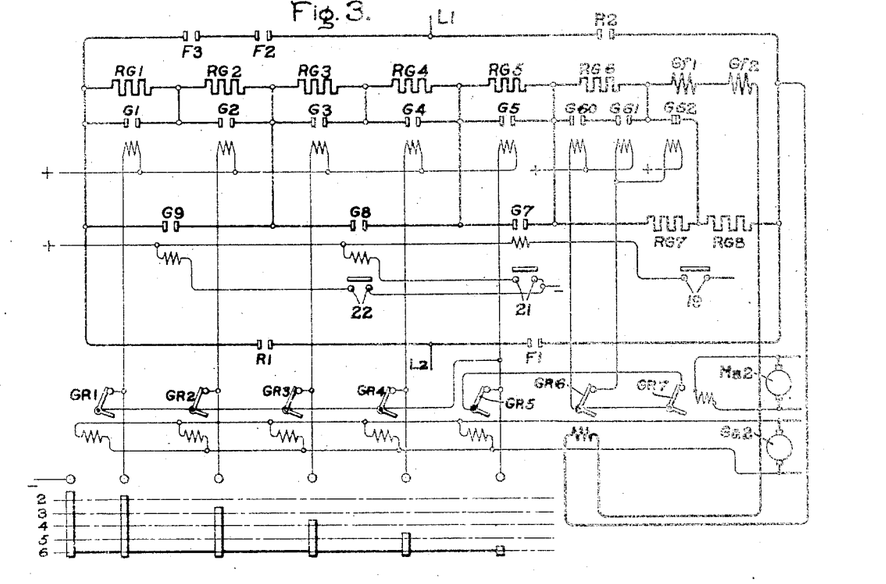
Figure 3 is another detail of Figure 1 showing the control system for the fields of the generators.
Figure 4:
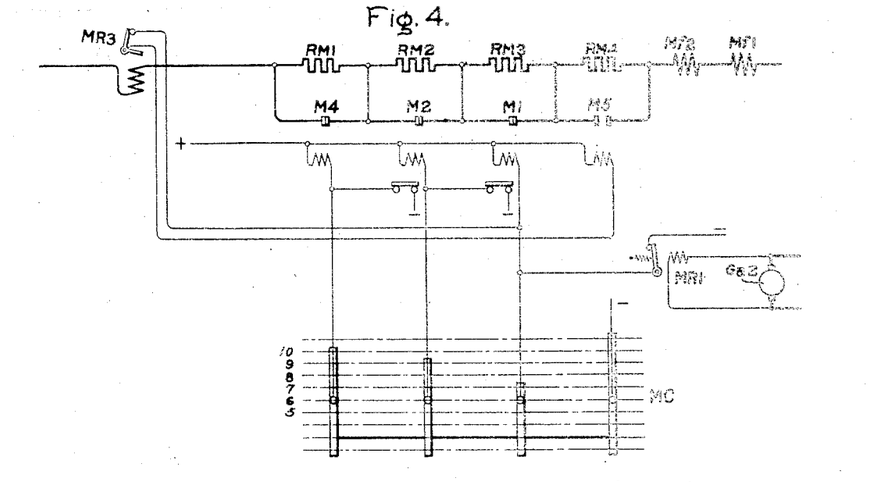
Figure 4 is a similar detail of Figure 1 showing the arrangement for the control of the fields of the motors.

In order to assist in an understanding of the features of the comparatively complicated system as shown in Figure 1, Figures 2, 3 and 4 have been shown in the drawings. Figure 2 shows the relation of the resistors and the contactors for controlling these resistors for the purpose of regulating the excitation of the generators and of the motors. Figure 3 is a detail of Figure 1 with certain of the parts simplified in order to show in simplified form the arrangement whereby the energization of the generator field windings is regulated in accordance with the position of the master controller and the voltage generated by the generators. Figure 4 is a similar detail for the purpose of explaining the arrangement whereby the energization of the motor field windings is regulated in accordance with the position of the master controller and the current taken by the motor field windings and the voltage of the generators.

By reference to Figure 3, it will be seen that only a portion of the master controller MC is shown—only so much as is necessary in order to obtain an understanding of the cooperation of the master controller with the other parts of the system in the regulation of the energization of the generator fields. This portion of the master controller is shown as being in the first position of the master controller shown in Fig. 1. It will be seen that the normally closed relays GR1, GR2, GR3, GR4 and GR5 are energized responsively to the voltage generated by the generator Ga2, the relay GR7 responsively to the voltage of the motor armature Ma2, and the relay GR6 is energized responsively to the current in the generator field windings. The operation of this part of the invention as shown in Figure 3 will now be explained.

The time required for the motors to accelerate from standstill to basic speed (full generator voltage-full motor field speed) or some intermediate speed depends on the rate of building up the generator voltage, which in turn depends on the rate of increase of the generator field current. In order that the time required to accelerate the motors may be of short duration, it is necessary to make the field current of the generators build up in a correspondingly short interval of time. This is termed "forcing" the generator field circuit. The generator field is "forced" during motor acceleration by cutting out of circuit both the variable and the permanent resistance in the field circuit of the generators, thereby applying excess voltage to the generator field terminals during the forcing intervals. When the desired motor speed is attained, resistance is automatically inserted in series with the generator field circuit to prevent further increase of generator voltage and motor speed.

Assume that the various contactors and relays and the master controller are in their respective positions shown in the drawing, Fig. 3, if the master controller is moved to position labelled 2, so that the second segment from the left makes engagement with its corresponding contact, the resistor contactor G1 will be directly energized through the master controller to short-circuit the resistance section RG1, it being assumed that the contactors F1, F2 and F3 are closed. The resistor contactor G2 will be energized through the master controller and the contacts of relays GR1 and GR2, the winding of contactor G3 will be energized through the master controller and the contacts GR1 and GR3, the winding of contactor G4 will be energized through the master controller and the contacts of relays GR1 and GR4, the winding of contactor G5 will be energized through the master controller and the contacts of relay GR1, and the windings of contactors G60, G61 and G62 will be energized through the master controller, the contacts of relays GR1, GR5, GR7 and GR6. Until the generator voltage has built up to a predetermined value corresponding to the second position of the master controller, the generator field resistors RG1 and RG6, inclusive, will all be shunted by their respective contactors, the resistors RG7 and RG8 will be in shunt to the generator fields, the voltage applied to these will be of such a high value that the generator excitation will build up at a suitable rate. This excess voltage will only be applied until the generator voltage has built up to a value corresponding to the position of the controller. The resistor RG8 is included in a multiple circuit to the generator field windings Gf1 and Gf2 in order to protect against the possibility of obtaining a high induced voltage in the field windings as would result from an interruption of the source of supply for these field windings. This resistor also influences the rate of decrease of the generator field energization and smoothes out any sudden increase of armature current as would result when dropping back from one controller point to a preceding point of the controller in case this field shunt were not provided. The resistor RG7 serves to limit the current taken from the supply during generator field forcing, since contactor G62 is open during field forcing.

When the voltage of the generator has built up to the value determined for the second position of the master controller, the relay GR1 will open its normally closed contacts, thereby de-energizing the resistor contactors G2, G3, G4, G5, G60, G61 and G62, thus inserting the resistors RG2, RG3, RG4, RG5 and RG6 in the generator field circuit. The closing of contactor G62 will establish the circuits of the field windings, resistors RG8 and RG7, as illustrated. The value of the voltage applied to the generator field windings will be a suitably high value until the voltage of the generators has built up to the value determined by the position of the controller and as soon as this value is reached, the further increase of the generator voltage, and consequently the motor speed, is arrested as long as the master controller is retained in its second position. If the master controller is now moved to its third position, that in which the third segment from the left also makes engagement with its respective contact, the winding of contactor G2 is energized directly through the master controller and the resistor contactors G3, G4, G5, G60, G61 and G62 are energized through the contacts of the relay GR2 instead of through the contacts of relay GR1 as was previously the case. More than normal voltage is again applied to the generator field windings until the generator voltage has built up to the value predetermined for the position of the controller corresponding to the third position in which the resistor contactor G2 is energized directly through the master controller. When the master controller is moved to the fourth operative position, that in which the resistor contactor G3 is energized directly through the master controller, the resistor contactors G4, G5, G60, G61 and G62 will be now temporarily energized through the master controller and the relay GR3 until the voltage of the generator has built up to the value corresponding to this position of the controller. When the voltage has built up to this position the relay GR3 will open its contacts, thus deenergizing the resistor contactors G4, G5, G60, G61 and G62. The relay GR4 in a similar manner controls the succeeding resistor contactors when the master controller is moved to the fifth operative position and the relay GR5 similarly controls the resistor contactors G60, G61 and G62 when the controller is moved to its sixth operative position. It will thus be seen that at each step of the controller, excess voltage is applied to the generator field windings until the generator voltage has built up to the value corresponding to the position of the controller. The generator fields are thus "forced" or in other words the field current is caused to build up rapidly until the generator excitation is sufficient to give a voltage corresponding to the position of the controller. Inasmuch as the voltage of the generator governs the speed of the motor, it can be seen that since the generator voltage is thus caused to increase as rapidly as possible, the motor speed is in turn caused to increase as rapidly as possible.

Both relays GR6 and GR7 protect against overvoltage on the generator by effecting the automatic opening of contactors G60 and G61, the relay GR6 being actuated in response to the value of the generator field current and relay GR7 in response to the motor armature voltage.

The time required for the motor speed to decrease from the maximum speed to basic speed or to some intermediate speed depends on the rate of increase of the current in the motor field circuit. In order that the time required to retard the motor may be of short duration, it is necessary to make the motor field current build up in a correspondingly short interval of time, which ordinarily necessitates "forcing" the motor fields.

The motor fields are forced by cutting out of circuit during retardation, both the variable and the permanent resistance, thereby applying excess voltage to the motor field terminals during the forcing interval. When the motor field current attains its normal value, the permanent resistance is automatically inserted in series with the motor field windings to prevent a further increase of the excitation current.

The arrangement is preferably such that generator field forcing is had regardless of the intent of the operator, and the motor field forcing is had or not at the will of the operator, since it is desirable that motor field forcing shall depend somewhat on the manner of manipulation of the controller. Thus, a maximum rate of retardation is available for emergency conditions without subjecting the machines to an excessive "pump back" current under the ordinary operating cycle.

By reference to Fig. 4, and Fig. 1, it will be seen that with the master controller MC in either the neutral position or any position prior to the position in which the full generator field excitation is obtained that the contactors M1 to M4 inclusive are all energized and the resistors RM1 to RM3 inclusive are all short-circuited, and by reason of the fact that the current of the field circuit is maintained at a predetermined value, the relay MR3 and the contactor M5 are open and the resistor RM4 is included in the field circuit. Thus substantially full motor field excitation is had. If now the controller is moved gradually so as to deenergize the contactors M1, M2 and M4 in succession, the resistors RM3, RM2 and RM1 are included in circuit successively. At some intermediate point the relay MR3 will release and close its contacts due to the decreasing field current. If the controller is now returned to or beyond the position indicated on the drawing, the coils of contactors M4, M2, M1 and M5 will be successively energized and these contactors will short-circuit their respective sections of resistance. The relay MR3 will have its contacts closed and contactor M5 will be energized to shunt the permanent resistor RM4 and thus full line voltage is impressed on the motor field windings. When the field current reaches full or substantially full strength, the relay MR3 will operate to open its contacts and thus effect the re-insertion of the resistor RM4 in the circuit and thus limit the full field excitation to the desired value.

Although the controller may be operated immediately to the maximum speed position before the motor has time to accelerate, the motor field is not weakened until approximately full voltage has been obtained on the generator. This function is accomplished through the control exercised by the relay MR1 which has normally closed contacts and is energized responsively to the voltage of the generator Ga2. Thus, the contacts of this relay are connected in multiple relation with the finger of the controller which directly controls the contactor M1, so that contactor M1 can not open unless the motors have obtained approximately basic speed as the result of full generator voltage, even though the controller is in such a position that the energizing circuit for the coil of contactor M1 through the controller is open. Since the coil of contactor M2 is energized through the auxiliary switch associated with contactor M1 and the coil of contactor M4 is energized through the auxiliary switch associated with contactor M2, the three contactors M1, M2 and M4 are maintained closed through the contacts of relay MR1 until the generator voltage corresponds to basic speed, even though the controller is in a position such that the circuits for these coils are all open through the controller. A gradual weakening of the motor field is thus accomplished regardless of the rate of manipulation of the controller.

Acceleration of the motors is thus accomplished in a plurality of steps:

(a) by increasing the generator field excitation while the motor field excitation is maintained constant;

(b) by decreasing the motor field excitation while full field excitation is maintained on the generator.

Retardation is also accomplished in a plurality of steps:

(c) by increasing the motor field excitation while the generator field excitation is maintained constant.

(d) by decreasing the generator field excitation while full field excitation is maintained on the motors.

Function (a) should preferably be completed before commencing function (b), otherwise the torque per ampere of the motors will be reduced thereby imposing an unnecessary load on the generators. Function (c) should preferably be completed before commencing function (d), since any simultaneous variation of the excitation of the fields—decreasing the generator field excitation while increasing the motor field excitation—will result in an excessive pump back current and therefore commutation difficulties.

The protection desirable during acceleration (c) is provided by means of relay MR1 which is actuated by generator voltage and used to prevent the motor field contactors from opening until a predetermined voltage exists on the generator.

The protection during retardation (d) is provided by means of the relay 2 (Fig. 1) and the relays Ff and Rr, working in conjunction with contactors G7, G8 and G9. When contactor M1 opens during the acceleration cycle it causes relay 2 to function, which in turn causes contactors G7, G8 and G9 to close successively, thereby shunting the resistors RG1 to RG5, inclusive. When retarding from above basic speed the motor field contactors close first, M1 finally de-energizing relay 2 through an auxiliary switch. The relay 2 is designed so as to be slow in opening and an interval of time is thus permitted to elapse before contactors G7, G8 and G9 can start to open. If the pump back current due to the dynamic braking action is sufficient to actuate the relay Rr or the relay Ff depending on whether the retardation is affected while the motor operation is in the forward or the reverse direction, respectively, a holding circuit for the coil of relay 2 is established through a contact disc of the Rr or Ff relay as the case may be, so that contactors G7, G8 and G9 can open only after the pump back braking action has decreased to a predetermined value. Contactor G9 also provides a second current limit controlled braking point.

The above described protective features for the purpose of preventing simultaneous variation of the generator and motor field circuits are entirely automatic in operation and provide restriction only when the controller is manipulated too rapidly.

With the above general description of the system, the system as constructed and arranged and with the various parts in their respective positions as shown in Fig. 1 will now be given. The disconnecting switch 5 in the control circuit will first be closed thus causing the under-voltage protective relay 1 to close. The circuit for the coil of this relay will be from the plus (+) conductor, the auxiliary switch 6 of the circuit breaker CB in the armature circuit of the machines, coil of 1, to the fourth segment from the top of the master controller MC, the second segment from the top to the negative (—) conductor. This relay will establish a maintaining circuit for itself through its main contact 7 to the negative conductor so that the master controller may be moved out of the neutral position and this relay remain closed and maintain a feed circuit for the third segment from the top of the controller MC. Contactors D1 and D2 are also energized to close, the circuit for these contactor coils being from the plus conductor to the contactor coils, through the auxiliary contacts 8 of the F2 contactor, the auxiliary contacts 9 of the R1 contactor, the top segment of the master controller, the fourth segment from the top of the master controller and the main contacts 7 of the relay 1 to the negative conductor. The closing of contactors D1 and D2 will establish what is known in the art as the "suicide" connection for the generator field windings, but since it has been assumed that the equipment is being started from rest, no function will be performed by these contactors at this time.

The motor field resistor contactors M1, M2 and M4 are also energized to give substantially full motor field excitation. These contactors are energized from the plus control wire, through the auxiliary switch 10 of relay 1 and the master controller segments—the contactor M1 through the fifth segment from the top of the master controller; the contactor M2 through the third segment from the top of the controller, and the contactor M4 through the sixth segment from the top of the controller. The contactor M5 will remain open at this time since the relay MR3 will be open by reason of the fact that substantially normal motor field excitation is had.

When the master controller is moved to the first running position forward, the coils of forward contactors F1, F2 and F3 are energized through the auxiliary switch contacts 11 of contactor R2 and the segment 12 of the master controller. The "suicide" connection contactors D1 and D2 are opened by reason of the contactor F2 opening the circuit through its auxiliary contacts 8. A feed circuit for the right hand insulated section of the master switch is established through the auxiliary contacts 13 of the F3 contactor and the segment 14 of the master switch. This insulated section of the master switch or controller controls the generator field resistor contactors.

At the second forward position of the master controller the contactor G1 is energized to close and shunt the resistor RG1 in the field circuit of the generators. It will be noticed that the contactors G2, G3, G4, G5, G60 and G61 are energized to close through the segment 15 of the master controller, contacts of relay GR1 and the contacts of relays GR2, GR3, GR4, and GR5 respectively as previously explained in connection with the simplified diagram Fig. 3. When the generator voltage builds up to the value corresponding to the second controller position the relay GR1 opens and effects the automatic opening of contactors G2, G3, G4, G60, and G61, thus limiting the generator voltage and the motor speed to the value determined by the second position of the controller. The generator field resistor contactors are thus energized successively, as explained in connection with Fig. 3, when the controller is advanced step by step to the sixth forward position, and field forcing is had under the control of the generator field controlling relays. If the controller had been thrown directly from the neutral position to the sixth forward position, the generator field resistors will be shunted progressively with field forcing obtained through the automatic control of the "permanent" resistor RG6, in a manner which will be apparent to those skilled in the art. It will be noticed that the contactor G62 is energized to open at the same time that contactor G61 is energized to close and includes the section of resistance RG7 in shunt to the generator fields so as to reduce the value of current taken from the source of supply during field forcing. When the controller is in the sixth position the contactor G5 is energized directly from the master controller and when the generator voltage has built up to a value corresponding to this point the generator field forcing is completed and all further increase of generator voltage ceases and the motors will operate at what is termed "basic" speed.

Moving the controller to the seventh point forward will deenergize contactor M1 by reason of the fact that the circuit for the coil of the contactor through the fifth segment of the master controller from the top will be opened. The motor field resistor RM3 will be inserted in the motor field circuit, thus increasing the motor speed still further. When the contactor M1 opens, it establishes an energizing circuit for the coil of relay 2, from the positive conductor, coil of the relay, auxiliary contacts 16 of contactor M1, contacts 17 of relay 1, auxiliary contacts 18 of contactor F2, auxiliary contacts 11 of contactor R2, segment 12 of the master controller, fourth segment from the top of the master controller, through the main contacts 7 of the relay 1 to the negative supply conductor. The closing of relay 2 establishes a circuit for the coil of contactor G7 through the auxiliary contacts 19 of relay 2, the circuit being from the plus conductor, conductor 20, coil of contactor G7, through the contacts 19 of relay 2 to the negative conductor. Contactor G7 in closing establishes a circuit for the coil of contactor G8 through the auxiliary switch 21, and contactor G8 in closing establishes an energizing circuit for the contactor G9 through the auxiliary contacts 22.

Further movement of the master switch to the eighth, ninth and tenth forward positions de-energizes contactors M2, M3 and M4 in sequence on the respective positions of the controller, the operation being as described in connection with Fig. 4.

If the master controller is operated at a normal slow rate to decrease the motor speed, the motor field contactors will close successively in the inverse order of their opening and the generator field resistor contactors will open successively in the inverse order of their closing without producing any abnormal or excessive armature current in the machines.

To provide against the excessive armature currents which would be caused by an emergency stop or a manipulation of the controller at a rate faster than the normal rate intended the protective features heretofore referred to generally are provided. For example, under the extreme condition in which the controller is returned directly from the full running position to the neutral position, the contactors M1, M2, M4 and M5 will close immediately and the generator field resistor contactors G1, G2, G3, G4 and G5 will open but the opening of these generator field resistor contactors produces no effect since the contactors G7, G8, G9, F1

F2 and F3 are maintained closed. It will be remembered that the relay 2 is energized through the auxiliary contacts 16 of contactor M1, and that this relay has a substantial time interval of opening so that the contactors G7, G8 and G9 are maintained closed for an interval, at least. If a sufficient value of pump back current is obtained, the relay Rr will function as heretofore explained generally and hereinafter explained specifically.

The "permanent" section of the motor field resistance RM4 will remain shunted until full motor field current is obtained at which time the relay MR3 will open its contacts and deenergize the motor field forcing contactor M5 thus including the section RM4 in the motor field circuit and limiting the further increase of motor field excitation.

A heavy armature current will be produced by this motor field forcing and cause a regenerative braking action to reduce the motor speed. This heavy armature current caused by the motor field forcing will cause the relay Rr to operate and open its two upper contacts and close its three lower contacts. A maintaining circuit for the coil of relay 2 is established through the contacts 23 of relay Rr, the circuit being from the plus control conductor, coil of relay 2, main contacts 24 of relay 2, contacts 23 of relay Rr, auxiliary contacts 11 of contactor R2, and auxiliary contacts 18 of contactor F2, and auxiliary contacts 25 of contactor G9 to the negative supply conductor. The contactors G7, G8 and G9 are thus maintained closed through the auxiliary contacts 19 of relay 2 and the auxiliary switches 21 and 22. A second maintaining circuit is also established for contactor G9; from plus, thru contactor coil, auxiliary switch 26, contact 27 of relay Rr, auxiliary contacts 11 of contactor R2, auxiliary contacts 18 of contactor F2, and auxiliary contacts 25 of contactor G9 to the negative supply conductor. The forward contactors F1, F2 and F3 are maintained closed through a circuit from the plus conductor, through the coils of the contactors, auxiliary contacts 18 of contactor F2, auxiliary contacts 25 of contactor G9 to the negative supply conductor.

When the "pump back" armature current decreases to a predetermined value, relay Rr will release and open contacts 23 and 27, thus deenergizing relay 2. When relay 2 opens, it deenergizes contactor G7 which in turn deenergizes contactor G8 causing the resistor RG5 to be reinserted in the generator field circuit by contactor G7 and resistors RG3 and RG4 to be re-inserted in contactor G8. If this produces a sufficient pump back armature current, relay Rr will again pick up and establish the aforesaid second maintaining circuit for contactor G9 before it has time to open. However, relay 2 is not energized to close by the pick up of relay Rr because the contacts 24 of relay 2 are open. When the relay Rr again drops out or opens, contactor G9 will open and since the contactor G8 had previously opened and opened the auxiliary contacts 22, contactor G9 will remain open. The opening of contactor G9 will deenergize the contactors F1, F2 and F3, thus disconnecting the generator field windings from the source of supply and permitting the contactors D1 and D2 to close and establish the aforesaid "suicide" connection for these field windings to bring the machines to rest quickly.

If excessive armature current is produced during forward acceleration, the relay Ff will pick up and thereby open contacts 28, and thereby deenergize the generator field forcing contactors G60 and G61, thus inserting the resistor RG6 in the generator field circuits and reducing the rate of motor acceleration. If an excessive armature current is produced above basic speed forward operation, relay Ff will pick up and establish through the contacts 29 a circuit which will cause the motor field contactors to reclose. If this reduces the armature current the relay Ff will open and the motor field contactors will again open. A slow pulsating action of the motor field contactors thus results and continues until the armature current is reduced to the normal value.

It is believed that with the above detailed description of the operation of the various parts of the system during motor acceleration, those skilled in the art will readily understand the operation of the system during motor operation in the reverse direction.

What I claim as new and desire to secure by Letters Patent of the United States is:—

1. In a control system, the combination with a dynamo-electric machine having a field winding, of a variable resistance in circuit with said winding, a controller having a plurality of definite positions for progressively varying the said resistance, and a plurality of electro-responsive devices, each of which is arranged to selectively operate at a definite value in response to a progressively varying predetermined condition of said machine, the said devices being connected to cooperate with the said controller to regulate the value of said resistance to temporarily obtain a value of voltage applied to said field winding at each definite resistance varying position of the controller which is different than the value normally determined by the position of the controller until the condition of the machine is at substantially the value determined for the position in which the controller is placed.

2. In a control system, the combination with a dynamo-electric machine having a field winding, of a variable resistance in circuit with said winding, a controller having a plurality of definite positions for progressively varying the said resistance, and an electro-responsive device for each of a plurality of the resistance varying positions of said controller, the said devices being connected to the said machine to respond progressively to a varying condition of the machine and connected to cooperate with the said controller to regulate the value of said resistance to temporarily obtain a value of the voltage applied to said field winding at each definite resistance varying position of the controller which is different than the value normally determined by the position of the controller.

3. In a control system, the combination with a generator having a field winding, of a variable resistance in circuit with said winding, a controller having a plurality of definite positions for progressively varying the said resistance to progressively vary the generator voltage, and an electro-responsive device for each of a plurality of the resistance varying positions of said controller, the said devices being connected to respond progressively at selected values of voltage of the generator corresponding to the positions of the controller, and connections whereby each of the said devices cooperates with the said controller to regulate the value of said resistance to obtain a value of the voltage applied to said field winding at each definite resistance varying position of the controller which is different than the value normally determined by the position of the controller until the voltage of the generator becomes substantially the value determined for the position of the controller.

4. In a control system, the combination with a generator having a field winding, of a variable resistance in circuit with said winding, a plurality of contactors for progressively shunting portions of the said resistance to progressively vary the generator voltage, a controller having a plurality of positions for progressively controlling the said contactors, a relay energized responsively to the generator voltage for controlling each of a plurality of said contactors, and connections whereby in each of said positions of the controller the resistance contactor or contactors corresponding to that position of the controller are energized directly through the controller to shunt a portion of the said resistance and the succeeding contactors to operate are energized through the relay corresponding to that position of the controller to force the field of the generator until the generator voltage has increased to the value predetermined for that position of the controller.

5. In a control system, the combination with a generator having a separately excited field winding, of a variable resistance in circuit with said winding, a controller having a plurality of definite positions for progressively varying the said resistance to vary the generator voltage, and an electro-responsive device energized responsively to the generator voltage for each of a plurality of the resistance varying positions of said controller, the said devices being adjusted to selectively operate in response to an increasing generator voltage and arranged to cooperate with the said controller to shunt the said resistance and force the energization of said field winding at each of the resistance varying positions of the controller until the generator voltage has increased to substantially the value predetermined for the position in which the controller is placed and to then re-insert the value of resistance in the field winding circuit determined for the position of the controller.

6. In a control system, the combination with a generator having a separately excited field winding, of a variable resistance in circuit with said winding, a controller having a plurality of definite positions for progressively varying the said resistance to vary the generator voltage, an electro-responsive device energized responsively to the generator voltage for each of a plurality of the resistance varying positions of said controller, the said devices being adjusted to selectively operate in response to an increasing generator voltage and arranged to cooperate with the said controller to shunt the said resistance and force the energization of said field winding at each of the resistance varying positions of the controller until the generator voltage has increased to substantially the value predetermined for the position in which the controller is placed and to then re-insert the value of resistance in the field winding circuit determined for the position of the controller, and means energized responsively to the current in the circuit of said winding for limiting the maximum energization of said field winding to a predetermined value.

7. In a control system, the combination with a dynamo-electric machine having a field winding, of a variable resistance in circuit with said winding, a controller having a plurality of definite positions for progressively varying the said resistance, an electro-responsive device energized responsively to the generator voltage for each of a plurality of the resistance varying positions of said controller, the said devices being adjusted to respond progressively to an increasing generator voltage, and connections whereby the said devices cooperate with the said controller to shunt the said resistance and force the energization of said field winding at each of the resistance varying positions of the controller until the generator voltage corresponds to the position in which the controller is placed and then include at least a portion of said resistance in circuit with the said winding when the generator voltage corresponds to the voltage determined for the maximum voltage position of said controller.

8. The combination with a generator having a separately excited field winding and a motor having its armature connected in a local circuit with the generator armature, of a variable resistance in circuit with said field winding, a controller for varying the said resistance to vary the generator voltage and the motor speed, and a polarized electro-responsive device connected to respond to a predetermined value of current in a predetermined direction in the said local circuit for limiting the rate of variation of the generator voltage.

9. The combination with a generator having a separately excited field winding and a motor having its armature connected in a local circuit with the generator armature, of a variable resistance in circuit with said field winding, a reversing multi-position controller for reversing the direction of the current in the said field winding to determine the direction of operation of the motor and for varying the said resistance to vary the generator voltage and the motor speed, and a pair of polarized electro-responsive devices, each of which is connected to respond to a predetermined value of current in a predetermined direction in the said local circuit and is arranged to control the said resistance to limit the rate of variation of the generator voltage during the acceleration of the motor and the retardation of the motor speed for each direction of motor operation.

10. In combination, a generator having a separately excited field winding and a motor having its armature connected in a local circuit with the generator armature, a separately excited field winding for said motor, means for varying the energization of the said generator field winding, a resistance in circuit with said motor field winding, a controller having a plurality of positions for varying the said resistance to vary the motor speed, and electro-responsive means energized to operate in response to a predetermined value of "pump back" current delivered by said motor to said generator when the said resistance is varied to decrease the motor speed for controlling the energization of the said generator field winding to automatically limit the value of "pump back" current while the motor speed is decreasing.

11. In combination, a generator having a separately excited field winding and a motor having its armature connected in a local circuit with the generator armature, a separately excited field winding for said motor, a variable resistance in the circuit of each of said field windings, a controller for decreasing the effective value of the said resistance in the generator field winding and then increasing the effective value of the said resistance of the motor field winding to accelerate the motor and for varying the said resistances in inverse order to decrease the motor speed, and electro-responsive means energized in response to a predetermined value of current in a predetermined direction in the said local circuit for controlling the said generator field winding resistance to maintain substantially full voltage applied to the generator field winding and automatically limit the value of "pump back" current delivered by said motor to said generator while the motor speed is decreasing when the said motor field resistance is varied to decrease the motor speed.

12. In combination, a generator having a separately excited field winding and a motor having its armature connected in a local circuit with the generator armature, a separately excited field winding for said motor, a variable resistance in the circuit of each of said field windings, a controller for reversing the current through the said generator field winding and for decreasing the effective value of the said resistance in the generator field winding and then increasing the effective value of the said resistance of the motor field winding to accelerate the motor for each direction of motor operation and for varying the said resistances in inverse order to decrease the motor speed for each direction of motor operation, and a pair of polarized electro-responsive devices for automatically controlling the said generator field winding resistance to limit the rate of decreasing the effective value of the said resistance in the generator field winding during acceleration of the motor and for maintaining substantially full voltage applied to the generator field winding to automatically limit the value of "pump back" current delivered by said motor to said generator while the motor speed is decreasing when the said motor field resistance is varied to decrease the motor speed, the said devices being connected to selectively respond to a pre-determined value of current in a predetermined direction in said local circuit, one of said devices being arranged to limit the rate of decrease of the effective value of the generator field resistance during motor acceleration in one direction and the other of said devices being arranged to maintain substantially full energization of the generator field winding in response to a predetermined value of "pump back" current for the same direction of motor operation, the said devices arranged to operate inversely for controlling the rate of acceleration and retardation of the motor speed for the opposite direction of motor operation.

13. The combination with a motor having a field winding, of a variable resistance in the circuit of said field winding and a controller having a plurality of positions for varying the said resistance to vary the motor speed, and means responsive to the current in the field winding circuit for limiting the value of the energization of said field winding to control the rate of change of the motor speed.

14. The combination with a motor having a field winding, of a variable resistance in the circuit of said field winding and a controller having a plurality of definite positions for decreasing the effective portion of said resistance to decrease the motor speed, and means energized responsively to the field winding current for automatically re-inserting at least a portion of the said resistance in the field winding circuit to limit the rate of decrease of the motor speed.

15. The combination with a motor having a separately excited field winding and a generator having its armature in a local circuit with the motor armature, of a variable resistance in the circuit of said field winding to vary the motor speed, a controller having a plurality of positions for successively decreasing the voltage of the generator and then decreasing the effective portion of said resistance to decrease the motor speed, means governed responsively to the voltage of said generator for preventing the decrease of the effective portion of said resistance until the voltage of the generator has decreased to a predetermined value, and means energized responsively to the current in the circuit of said field winding for automatically re-inserting at least a portion of said resistance in the circuit of said field winding to limit the rate of decrease of the motor speed.

16. In a control system, the combination with a generator having a field winding, means comprising a resistance and a controller having a plurality of resistance varying positions for varying the value of the current in the said field winding, a resistor for shunting current from the said field winding, and means energized responsively to the generator voltage for including the said resistor in shunt to the said field winding at each resistance varying position of said controller until the voltage of the generator corresponds to the value predetermined for the resistance varying position in which the controller is placed.

17. In a control system, the combination with a generator having a field winding, means comprising a resistance and a controller having a plurality of resistance varying positions for varying the value of the current in the said field winding, a resistor for shunting current from the said field winding, and means energized responsively to the generator voltage for obtaining substantially full voltage applied to the said field winding and for including the said resistor in shunt to the said field winding at each resistance varying position of said controller until the voltage of the generator corresponds to the value predetermined for the resistance varying position in which the controller is placed.

In witness whereof, I have hereunto set my hand this 8th September, 1924.

GEORGE B. STARIE.